US009135953B2

(12) United States Patent
Lee et al.

(10) Patent No.: US 9,135,953 B2
(45) Date of Patent: Sep. 15, 2015

(54) METHOD FOR CREATING, EDITING, AND REPRODUCING MULTI-OBJECT AUDIO CONTENTS FILES FOR OBJECT-BASED AUDIO SERVICE, AND METHOD FOR CREATING AUDIO PRESETS

(75) Inventors: Tae-Jin Lee, Daejon (KR); Yong-Ju Lee, Daejon (KR); Jae-Hyoun Yoo, Daejon (KR); Dae-Young Jang, Daejon (KR); In-Seon Jang, Daejon (KR); Jin-Woo Hong, Daejon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 996 days.

(21) Appl. No.: 12/527,330

(22) PCT Filed: Feb. 18, 2008

(86) PCT No.: PCT/KR2008/000929
§ 371 (c)(1),
(2), (4) Date: Aug. 14, 2009

(87) PCT Pub. No.: WO2008/100119
PCT Pub. Date: Aug. 21, 2008

(65) Prior Publication Data
US 2010/0076577 A1    Mar. 25, 2010

(30) Foreign Application Priority Data

Feb. 16, 2007    (KR) .................. 10-2007-0016744

(51) Int. Cl.
*G06F 17/00*    (2006.01)
*G11B 27/034*    (2006.01)
(Continued)

(52) U.S. Cl.
CPC ............ *G11B 27/034* (2013.01); *G10L 19/008* (2013.01); *G11B 27/3027* (2013.01)

(58) Field of Classification Search
CPC ..................................................... G10L 19/008
USPC .............................................................. 700/94
See application file for complete search history.

(56) References Cited

U.S. PATENT DOCUMENTS

2002/0062313 A1* 5/2002 Lee et al. ........................ 707/3
2007/0198551 A1* 8/2007 Barnes et al. ................. 707/100

FOREIGN PATENT DOCUMENTS

EP    1 206 135 A1    5/2002
JP    2001-103428 A    4/2001
(Continued)

OTHER PUBLICATIONS

JeaHyoun Yoo, et al; "Object Based Three Dimensional Audio Broadcasting System for Interactive Broadcasting System", Journal of Korea Multimedia Society, Jun. 2006, vol. 10, No. 2, pp. 84-96.
(Continued)

*Primary Examiner* — Joseph Saunders, Jr.
(74) *Attorney, Agent, or Firm* — Ladas & Parry LLP

(57) ABSTRACT

Provided are a method for creating, editing and reproducing a multi-object audio content file for an object-based audio service and a method for creating audio presets. The multi-object audio content file creating method includes creating a plurality of frames for each audio object forming an audio content; and creating a multi-object audio content file by grouping and storing the frames according to each reproduction time. This invention can enhance functions of the object-based audio service and make it easy to access to each audio object of an audio content file.

20 Claims, 9 Drawing Sheets

(51) Int. Cl.
*G10L 19/008* (2013.01)
*G11B 27/30* (2006.01)

(56) References Cited

FOREIGN PATENT DOCUMENTS

| JP | 2004-126214 A | 4/2004 |
|---|---|---|
| JP | 2005-150993 A | 6/2005 |
| JP | 2006-503491 A | 1/2006 |
| JP | 2006-516164 A | 6/2006 |
| KR | 1020000027806 A | 5/2000 |
| KR | 1020020080594 A | 10/2002 |
| KR | 1020040009925 A | 1/2004 |
| KR | 1020040037437 A | 5/2004 |
| KR | 1020060010132 A | 2/2006 |

OTHER PUBLICATIONS

International Search Report: mailed May 27, 2008; PCT/KR2008/000929.

Seungkwon Beack et al; "Further information of a new application for SAOC", 78. MPEG Meeting; Oct. 23-27, 2006; Hangzhou; (Motion Picture Expert Group or ISO/IEC JTC1/SC29/WG11), No. M13899, Oct. 18, 2006, XP030042567, ISSN: 0000-0233.

Jeongil Seo, et al; "Update of Multichannel Visualization Tool for MPEG Surround", 77. MPEG Meeting; Jul. 17-21, 2006; Klagenfurt; (Motion Pictureexpert Group or ISO/IEC JTC/SC29/WG11),, No. M13552, Jul. 12, 2006, XP030042221, ISSN: 0000-0236.

Taejin Lee, et al; "A Personalized Preset-based Audio system for Interactive Service", Audio Engineering Society Convention Paper, New York, NY, US, No. 6904, Oct. 5, 2006, pp. 1-6, XP002531682, kRetrieved from the Internet: URL:http://www.aes.org/tmpFiles/elib/20090611/13738.pdg [retrieved on Oct. 8, 2006].

Taejin Lee, et al; "An Object-based 3D Audio Broadcasting System for Interactive Service", Audio Engineering Society Convention Paper, New York, NY, US, No. 6384, May 28, 2005, pp. 1-8, XP002577516, Retrieved from the Internet: URL:http://www.aes.org/empFiles/elib/20100413/13100.pdf [Retrieved on Apr. 12, 2010].

European Search Report dated Nov. 17, 2011; EP 08 71 2536.

Jaehyun Yoo, et al, "Object-based Three-dimensional Audio Broadcasting System for Interactive Broadcasting Service", Jun. 2006, Convention Paper 6384 118th Convention Audio Engineering Society; XP002577516, 21 pages.

Taejin Lee, et al. "Object-Based 3-Dimensional Audio Technology and Service". 118th Convention Spring Preprints 2005, May 28-31, 2005; Barcelona, Spain, 11 pages.

\* cited by examiner

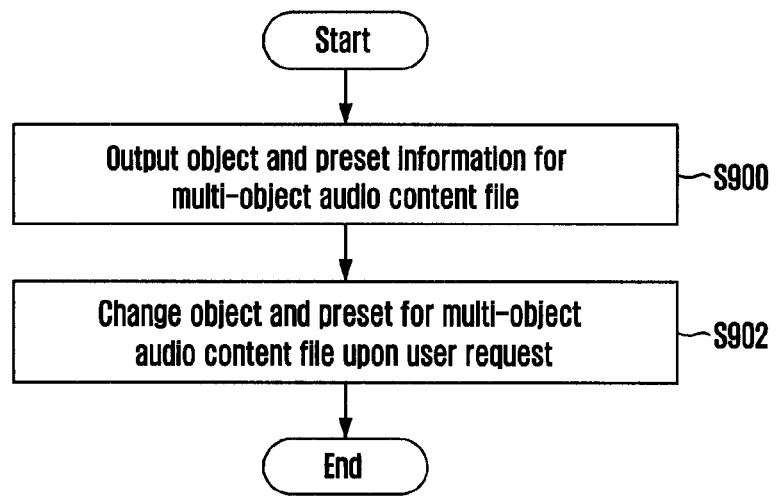
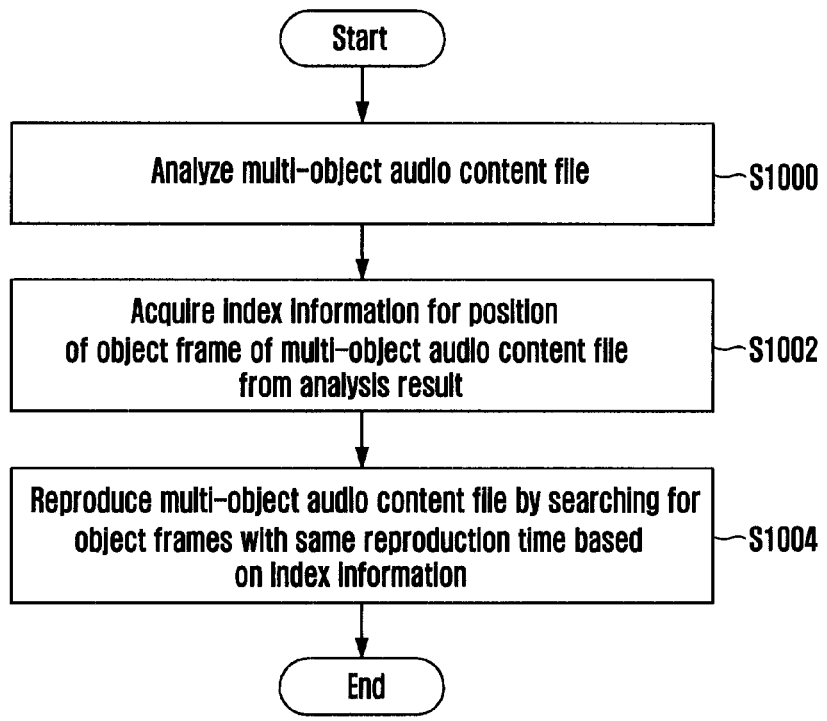

METHOD FOR CREATING, EDITING, AND REPRODUCING MULTI-OBJECT AUDIO CONTENTS FILES FOR OBJECT-BASED AUDIO SERVICE, AND METHOD FOR CREATING AUDIO PRESETS

TECHNICAL FIELD

The present invention relates to a method for creating, editing, and reproducing multi-object audio content files for an object-based audio service and an audio preset creating method therefor; and, more particularly, to a multi-object audio content file creating, editing, and reproducing method that can enhance performance of an object-based audio service and ease access to each audio object of an audio content file, and an audio preset creating method therefor.

BACKGROUND ART

Audio signals provided through a broadcasting service such as television (TV) broadcast, radio broadcast, and digital multimedia broadcast are acquired by combining audio signals of diverse sound sources into audio signals of a form, and storing and transmitting the audio signals of a form.

In this environment, viewers can adjust the signal strength of the entire audio signals but they cannot control the characteristics of audio signals of each sound source, for example, they cannot control signal strength of audio signals of a specific sound source included in the audio signals of the combined form.

However, if an audio content is authored not by combining audio signals of respective sound sources but by storing them independently, a content reproduction terminal can provide the audio content to the viewers with an option of controlling signal strength of audio signals of each sound source. An audio service for independently storing/transmitting a plurality of audio signals in a storing and transmitting block so that viewers could watch controlling each audio signals properly in a receiver, which is the content reproduction terminal, is called 'an object-based audio service.'

Differently from typical MP3, Advanced Audio Coding (AAC), the object-based audio content includes several audio objects. Moving Picture Experts Group (MPEG) 4 system specification (ISO/IEC 14496-1), which defines a file structure of a content including several objects, may be applied for storing object-based audio contents.

Typically, most multimedia services are formed of one audio object and one video object. MPEG-4 system specification, however, defines a multimedia service including a plurality of objects. The object-based audio service, too, can be called a multimedia contents service including a plurality of objects, which is similar to what is defined in the MPEG-4 system specification.

However, while the MPEG-4 system specification defines a file structure including diverse kinds of media such as audio, video, still picture and the like, an object-based audio content includes objects of the same kind. Thus, the object-based audio service can store contents more efficiently than the file structure defined in the MPEG-4 system specification and ease access to each object.

Meanwhile, the MPEG-4 system specification (ISO/IEC 14496-1) also defines a file structure of a content including a plurality of objects. The file format of the MPEG-4 system specification includes 'BIFS', 'OD', and 'index information.' 'BIFS' is three-dimensional (3D) scene information of objects and 'OD' is information on objects. 'Index information.' is information for accessing to stream of each object, which will be referred as object stream. Data of each object may be inside a file or they may be formed as another file. The 'index information' for object stream is formed and stored separately for each object, and object streams are also divided and stored for each stream.

In the respect of easy access to an object, the conventional object-based audio content service according to the MPEG-4 system specification has a problem of remarkably low access property to an object, when a plurality of objects are stored. This is because the conventional object-based audio content service stores frames for each for object or data of the entire objects sequentially.

Also, the conventional object-based audio content service uses position information and size information of each frame as the 'index information' to make random access to objects of a content file even easier. However, the conventional index information creating method creates index information based on the least reproduction unit of each medium, which is a frame in case of audio. In other words, index information should be created on a frame basis. Therefore, a great deal of index information is generated and the amount of operations for acquiring index information is also huge. Thus, it takes long time to make a random access.

Meanwhile, the MPEG-4 system specification can change three-dimensional (3D) scene information through user interaction by using BIFS data and BIFS commands. In an authoring step, BIFS data are properly created based on the changed 3D scene information. A content reproduction terminal should be able to analyze BIFS commands. As described above, the MPEG-4 system specification includes diverse functions for user interaction. To have such functions, the authoring step or the content reproduction terminal requires a little complicated operation.

However, if a user controls the position and sound volume of each audio object in the object-based audio service, new 3D audio scene information (which is preset) can be created easily.

If a user can freely create audio preset or add/delete/change an object of an object-based audio content file, the functions of the object-based audio service can be enhanced through user interaction.

Therefore, it is required to develop an efficient content file structure that can enhance functions of the object-based audio service and make access to each object easier in an object-based audio content service.

DISCLOSURE

Technical Problem

An embodiment of the present invention, devised to fulfill the requirement, is directed to providing a method for creating, editing and reproducing a multi-object audio content file, the method that can enhance functions of an object-based audio service and ease access to each object of the audio content file, and to providing an audio preset creating method.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an aspect of the present invention, there is provided a method for creating a multi-object audio content file for an object-based audio service, which includes: creating a plurality of frames for each audio object forming an audio content; and creating a multi-object audio content file by grouping and storing the frames according to each reproduction time. The method further includes: creating index information for each frame group and storing the index information in a header of the multi-object audio content file, creating an audio preset based on the audio objects of the audio content, and creating preset related information including the number of generated audio presets and preset names.

In accordance with another aspect of the present invention, there is provided a method for creating a multi-object audio content file for an object-based audio service, which includes: creating a plurality of frames for each audio object forming an audio content; and creating a multi-object audio content file by storing the frames according to each audio object, wherein position information of each of frames having the same reproduction time are stored as index information in a header of the multi-object audio content file. The method further includes: creating an audio preset based on the audio objects of the audio content, and creating preset related information including the number of generated audio presets and preset names.

In accordance with another aspect of the present invention, there is provided a method for creating audio presets for a multi-object audio content file, which includes: receiving a selection for an audio object needed for creation of an audio preset among audio objects of the multi-object audio content file from an editor or a user; receiving preset setup information on the audio object selected by the editor or the user; and creating an audio preset by setting up the audio object based on the preset setup information. The method further includes creating preset related information including the total number of generated audio presets and preset names.

In accordance with another aspect of the present invention, there is provided a method for editing a multi-object audio content file, which includes: providing a user with audio object information and audio preset information for a multi-object audio content file; and changing an audio object or an audio preset for the multi-object audio content file upon receipt of a user request.

In accordance with another aspect of the present invention, there is provided a method for reproducing a multi-object audio content file, which includes: analyzing a multi-object audio content file to thereby produce an analysis result; acquiring index information on position of each object frame of the multi-object audio content file from the analysis result; and reproducing the multi-object audio content file by searching for the frames of audio objects having the same reproduction time based on the index information. The method further includes: outputting a kind of an audio preset for the multi-object audio content; and forming a corresponding audio scene based on preset setup information of an audio preset selected by a user.

The technology of the present invention provides a user selection function in an object-based audio service by storing a plurality of preset audio scene information in the inside of an audio content file, and makes a user create a new audio scene by storing preset audio scene information defined by the user in the inside of the object-based audio content file.

Also, the present invention groups frames of objects having the same reproduction time or decoding time into a group for easy access to objects of an object-based audio content, instead of storing frames for each object. In short, when a plurality of objects are stored in a file, the entire object data are not stored sequentially but frames of the same reproduction time are grouped and stored.

Also, index information is not stored for each frame but stored on the basis of a predetermined frame or time unit to easily access to each object of the file.

In addition, according to the present invention, a plurality of preset information (presets and preset related information) are created and stored in an audio content file or stored as a separate file. Preset information stored as a separate file may be stored in the corresponding audio content file through a process on the part of a user later.

Advantageous Effects

As described above, the present invention has an effect of reducing bandwidth in an object-based audio service by efficiently storing and transmitting object-based audio contents.

Also, the present invention eases access to objects of an object-based audio content by grouping frames of objects having the same reproduction time into a group and storing in a corresponding audio content file instead of storing frames for each object, and storing index information on the basis of a predetermined frame or time unit instead of storing them for each frame.

Also, when an object-based audio content is stored, the present invention makes it possible to efficiently reproduce the object-based audio content by enhancing functions of the object-based audio service and providing an efficient audio content file structure that can ease access to each object more than a general file format.

In addition, the present invention can efficiently reproduce an object-based audio content by storing preset established based such properties as position and sound level of each object in the inside of the object-based audio content file or as a separate file and providing a user with the file including the preset.

Furthermore, the present invention can be applied to all broadcasting services and multimedia services that provide an object-based audio service, such as digital broadcasting, radio broadcasting, Digital Multimedia Broadcasting (DMB), internet broadcasting, digital movies, Digital Versatile Disc (DVD), moving picture contents, and phonograph records, to efficiently transmit, store and reproduce object-based audio contents.

BRIEF DESCRIPTION OF THE DRAWINGS

FIG. 9 is a flowchart describing a method for editing a multi-object audio content file in accordance with an embodiment of the present invention.

FIG. 10 is a flowchart describing a method for reproducing a multi-object audio content file in accordance with an embodiment of the present invention.

BEST MODE FOR THE INVENTION

The advantages, features and aspects of the invention will become apparent from the following description of the embodiments with reference to the accompanying drawings, which is set forth hereinafter. When it is considered that detailed description on a related art may obscure a point of the present invention, the description will not be provided herein. Herein, specific embodiments of the present invention will be described with reference to the accompanying drawings.

Figure 1:
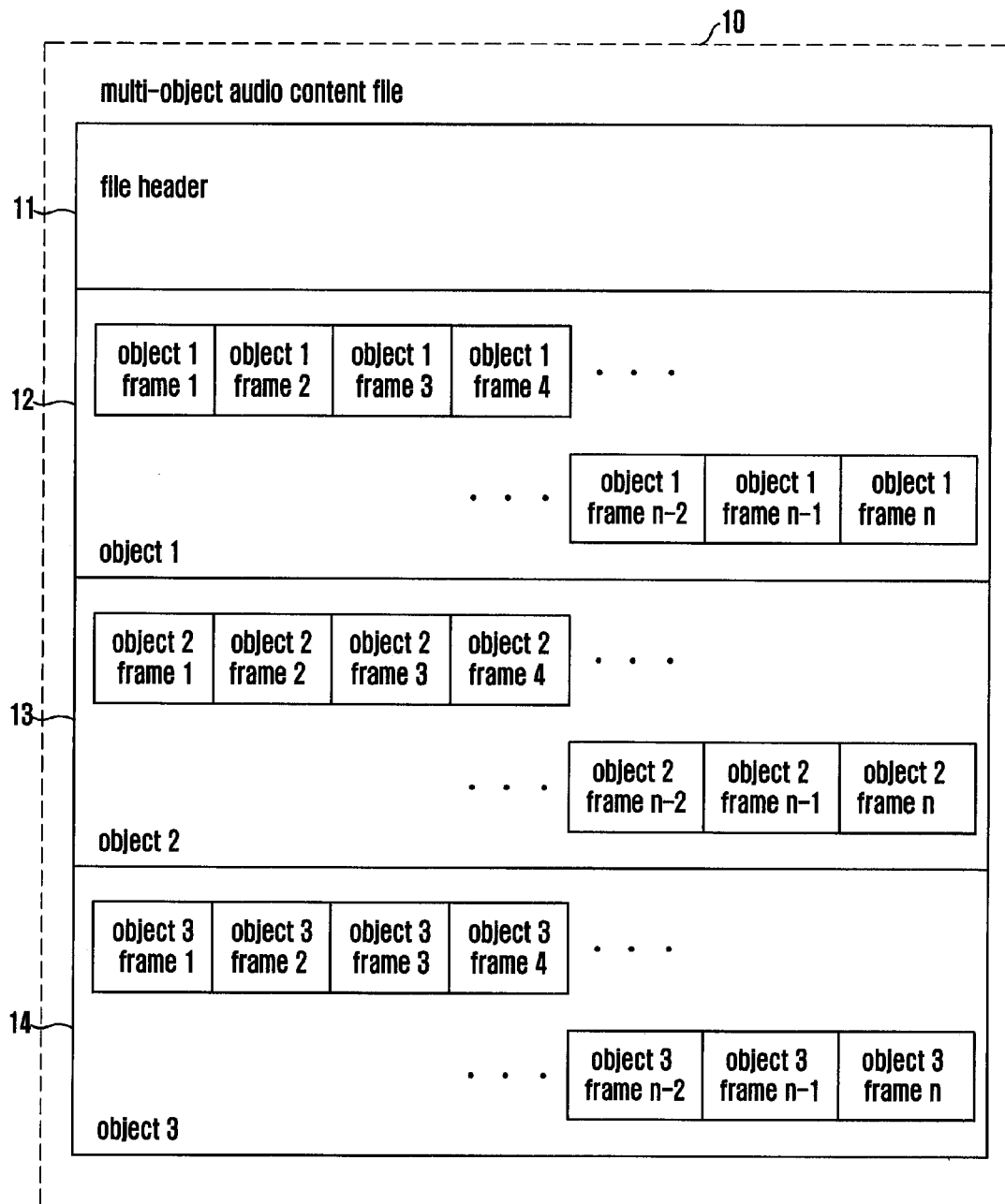
FIG. 1 illustrates a typical audio content file including a plurality of objects according to MPEG-4 system specification.
Figure 2:
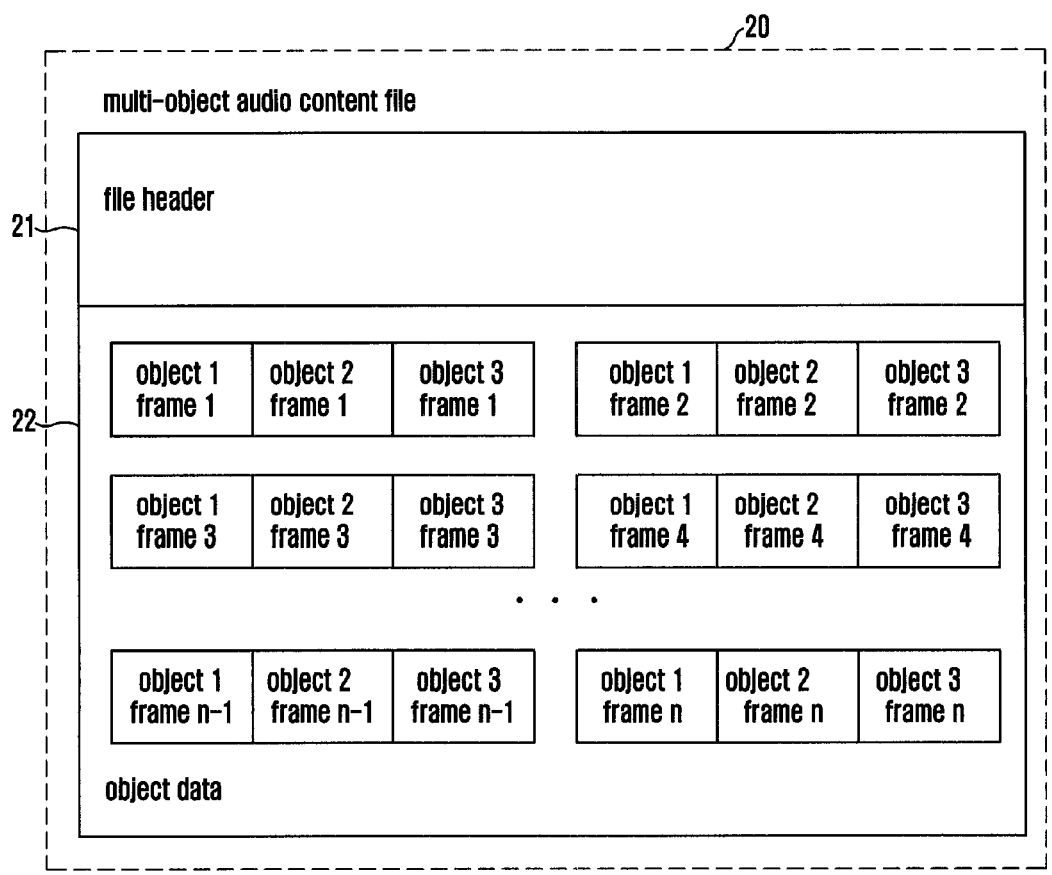
FIG. 2 illustrates a multi-object audio content file for an object-based audio service in accordance with an embodiment of the present invention.

FIG. 1 illustrates a typical audio content file including a plurality of objects according to MPEG-4 system specification. FIG. 2 illustrates a multi-object audio content file for an object-based audio service in accordance with an embodiment of the present invention.

Basically, the object-based audio service related to the present invention can follow the content file structure defined in Moving Picture Experts Group (MPEG) 4 system specification, because it handles contents having a plurality of objects.

The object-based audio service may include about one video object if necessary. However, in most cases, it includes only audio objects and each audio object uses the same coding scheme, the same frame size (which signifies time taken for one frame to be decoded and reproduced), the same frame rate, and the same reproduction time information. The contents of the object-based audio service can have a more efficient file structure than the file structure defined in the MPEG-4 system specification a.

A multi-object audio content file 10 according to the MPEG-4 system specification includes a header 11 and object data 12 to 14. When the object data are stored in a plurality of frames according to each object 12 to 14, as illustrated in FIG. 1, frames for each object should be found out to acquire frames to be reproduced at the same time. Herein, if there are many objects, the number of times for searching for frames of each object in the inside of the file becomes large.

If the multi-object audio content file 20 to 22 has the file structure of FIG. 2, the frames of the same reproduction time are all brought together, frames of the same reproduction time can be searched for at once even though there are many objects.

Thus, the present invention does not store the entire object data sequentially, which is a method shown in FIG. 1, but stores the object data by grouping frames of the same reproduction time, which is a method shown in FIG. 2, when the multiple objects are stored in a file to provide the object-based audio service. In short, frames for each object constituting an audio content are grouped and stored in an audio content file based on the reproduction time.

Figure 3:
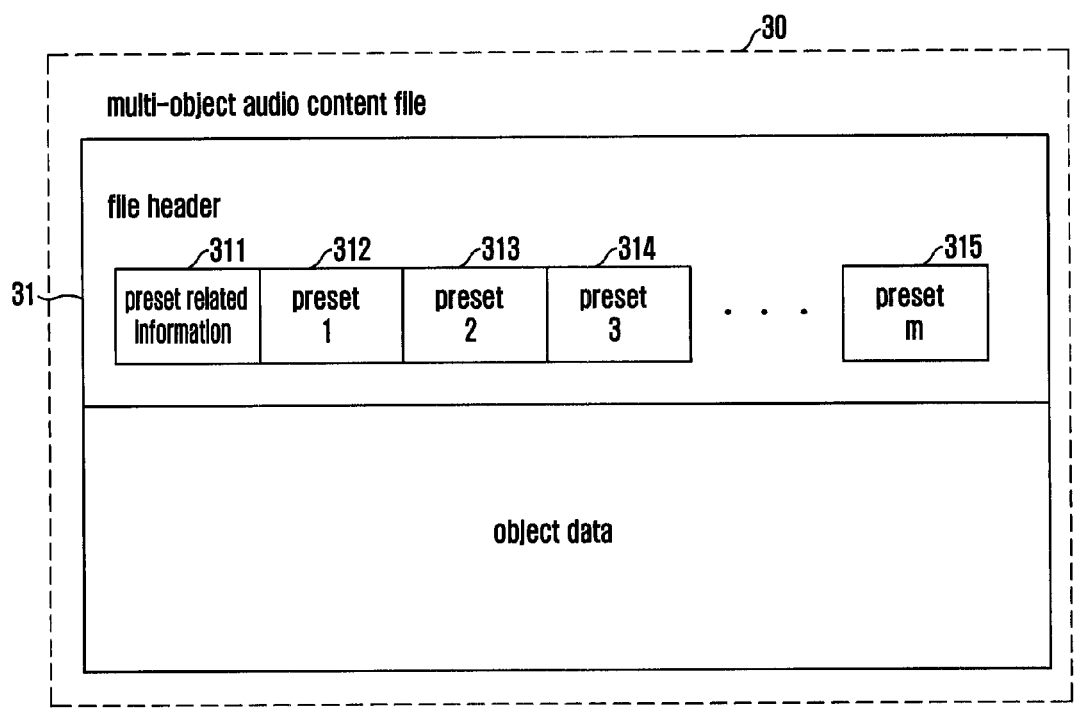
FIG. 3 illustrates a multi-object audio content file including editor preset information in accordance with an embodiment of the present invention.
Figure 4:
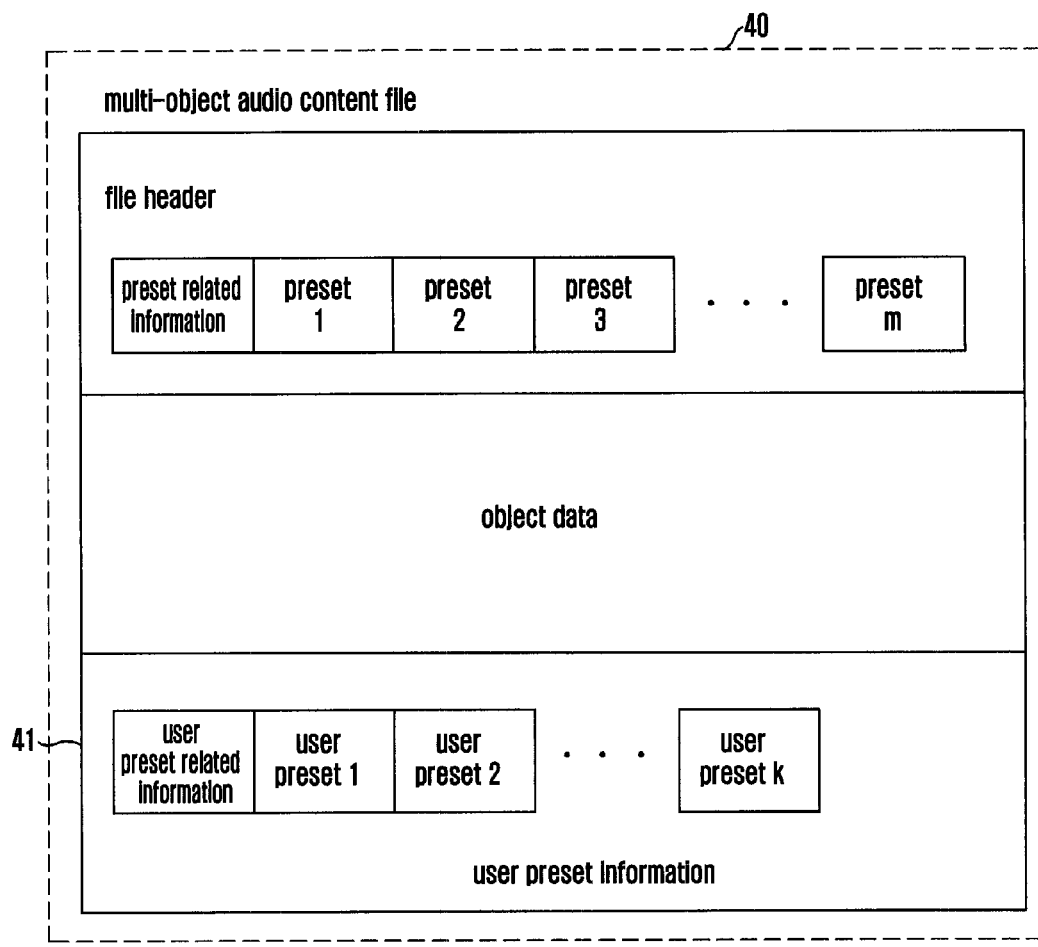
FIG. 4 illustrates a multi-object audio content file including user preset information in accordance with an embodiment of the present invention.

FIG. 3 illustrates a multi-object audio content file including editor preset information in accordance with an embodiment of the present invention. FIG. 4 illustrates a multi-object audio content file including user preset information in accordance with an embodiment of the present invention.

According to the MPEG-4 system specification, three-dimensional (3D) scene information can be changed through interaction with a user based on BIFS data and BIFS commands. BIFS data should be property generated in consideration of changing the 3D scene information in an authoring step. Also, a user terminal, which is an audio content reproduction terminal, should be able to analyze the BIFS commands. As it can be seen from the above description, the MPEG-4 system specification includes diverse functions for interaction with users. To provide the functions, a little complicated operation is required in the authoring step and the content reproduction terminals.

However, in the object-based audio service, a service provider should provide 3D audio scene information defining such features as the position of each object and sound strength in the form of preset, whereas a content reproduction terminal should include relatively simple control functions such as a function of controlling preset. Since the functions can be easily controlled in the content reproduction terminal, they can be easily realized in the content reproduction terminal without employing the complicated structure such as the somewhat complicated structure of the MPEG-4 system specification.

Therefore, it is efficient for the service provider of object-based audio contents to provide only 3D audio scene information formed of multiple audio objects and to realize content reproduction terminals to control the 3D audio scene information.

For this, the present invention uses a method of simply adding several pre-authored 3D audio scene information to object-based audio contents. Herein, the pre-authored 3D audio scene information are primarily created by a content author.

According to the present invention, as illustrated in FIG. 3, editor preset information is stored in a file header 31 of an object-based audio content file. The editor preset information includes preset related information 311, such as the total number of presets and preset name, and presets 312 to 315 including characteristics of audio objects, such as spatial position of each audio object, sound strength (which is a signal level), and echo information. The editor preset information may not be stored in an object-based audio content file but stored as an independent file and provided to a user.

A content reproduction terminal (e.g., receiver of a viewer) for receiving and reproducing the audio content file of the structure shown in FIG. 3 acquires audio characteristics of each object from the preset related information 311 and the presets 312 to 315 and reproduces 3D audio by properly controlling the objects.

Meanwhile, in the object-based audio service, the user of a content reproduction terminal may create a new 3D audio scene information by controlling the position of each audio object and sound strength (which is a signal level). When the new 3D audio scene information is stored, it becomes the user preset shown in FIG. 4. The user preset is a preset crated not by the editor on the part of the object-based audio service provider but by the user.

The audio content file of the present invention has a structure that a user preset 41 authored by a user is stored in an object-based audio content file 40. Therefore, the user receiving the object-based audio service can store the user preset information 41 that the user authored in the received audio content file 40. Differently from this, a user 1 may store the user preset information as an independent file from the audio content file and provide the independent file to another user 2. The user preset information 41 provided as an independent file may be included in the object-based audio content file later through a post-process of the user 2.

In short, as illustrated in FIG. 4, the present invention can make a user control each audio object to create 3D audio scene and set up the 3D audio scene as one preset by storing the user preset information 41 in the multi-object audio content file 40. Herein, the user preset information defined by the user may be stored inside a file, as shown in FIG. 4, or it may be stored as an independent file, although this is not presented in the drawings. The user preset information stored in the form of an independent file may be included in the corresponding file later through a post-process, which is the same process as the 'editor preset information' of FIG. 3.

Figure 5:
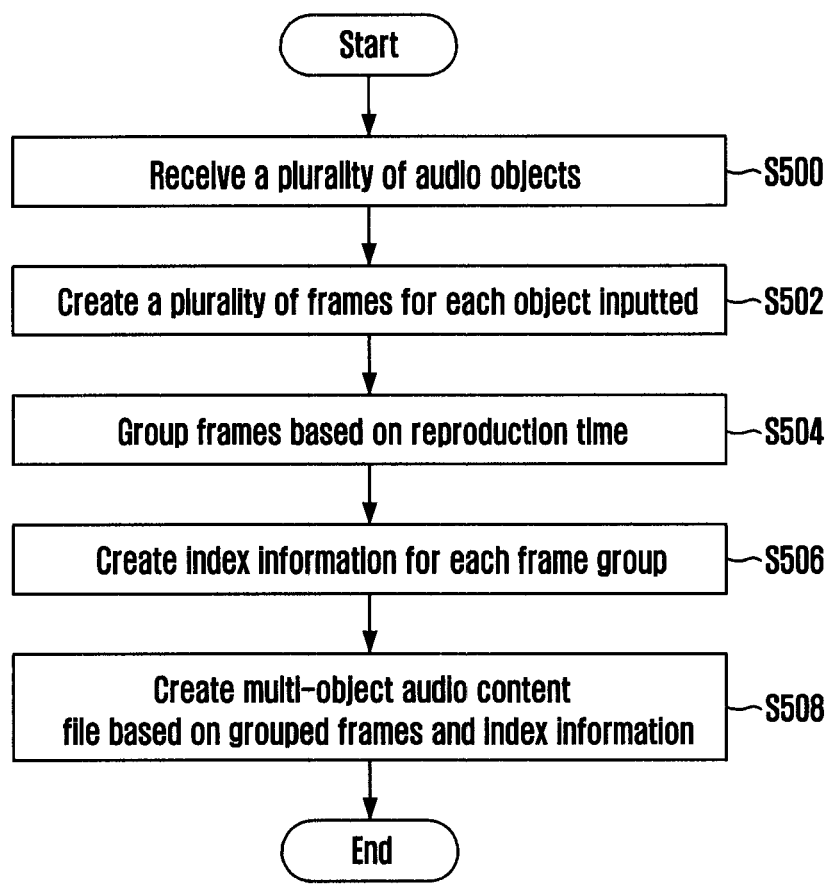
FIG. 5 is a flowchart describing a multi-object audio content file creating method for an object-based audio service in accordance with an embodiment of the present invention.

FIG. 5 is a flowchart describing a multi-object audio content file creating method for an object-based audio service in accordance with an embodiment of the present invention. The operation is performed in an audio coding apparatus providing an object-based audio service.

Typical audio compression algorithms compress audio on a frame basis. Thus, they store data on a frame basis. When a multi-object audio content is created out of multi-object audio signals stored on a frame basis, audio signals are not sequentially stored according to each object, and multi-object frames having the same reproduction time are grouped and stored. This way, data can be efficiently transmitted through the Internet. Also, if information on frames having certain reproduction time is searched for in the multi-object audio content file and stored as index information, it is possible to efficiently reproduce data at a certain location later in a content reproduction terminal.

The audio coding apparatus receives a plurality of audio objects constituting an audio content in step S500, and creates a plurality of frames for each object by storing each object in the form of frames in step S502.

In step S504, the audio coding apparatus groups the created multiple frames based on the reproduction time and, in step S506, creates index information according to each frame group.

In step S508, the audio coding apparatus stores the frame groups as object data 22 (see FIG. 2) and store the corresponding index information in the header 21 to thereby create a multi-object audio content file (see FIG. 2).

Hereinafter, an index information creation process of the step S506 will be described in detail.

A typical media file uses a method of providing location information and size information of each frame as index information in order to make an easy random access in the file. The index information is generally created based on the minimum reproduction unit of each medium (for example, in case of audio, the index information is created on a frame basis).

However, the present invention uses a method of creating the index information not on the minimum reproduction unit of a medium but on the basis of a predetermined unit acquired by grouping a plurality of the minimum reproduction units. When index information is created according to the method of the preset invention, the size of the index information can be smaller than that of general cases and the size of the index information can be controlled as well. Also, it is possible to improve the speed of random access and reduce the amount of computation for the random access.

According to the method of the present invention, the resolution by direct access may be decreased because direct access to media data is executed on a group basis. However, since it is possible to make an access on a frame basis by tracing media data after the direct access, the actual resolution is not different from general frame-unit indexing. Particularly, when it is considered that it is generally possible to perform indexing on a second basis and there is no big problem in watching multimedia contents through random access, it can be said that the present invention is very effective.

For example, let's assume that there is a one minute-long audio object having about 43 frames per second and one index information has 8 bytes. When indexing is executed according to a conventional indexing method, 20,640 bytes are required as shown in the following Equation 1. This is because the index information should be created according to each frame.

$$60(\text{sec}) \times 43(\text{frames/sec}) \times 8(\text{bytes}) = 20,640(\text{bytes}) \qquad \text{Eq. 1}$$

Meanwhile, when the index information is crated for each frame group in accordance with an embodiment of the present invention, for example, when it is assumed that one index information is created for every 20 frames, it takes about 1,320 bytes, which is described in the following Equation 2. Since index information which used to be created for each frame is created for every 20 frames, it is possible to save bytes by 1/20. Herein, the index information created according to each frame group includes position information of the first frame of each group. The index information created as above is stored in the header of a multi-object audio content file.

$$60(\text{sec}) \times 43/20(\text{indexing/sec}) \times 8(\text{bytes}) = 1,320(\text{bytes}) \qquad \text{Eq. 2}$$

According to the present invention, the resolution by direct access has increased by 20 times, but this corresponds only about 0.5 second, which is an extent that hardly affects the watching of a user when a coding apparatus makes a random access to an actual medium and makes reproduction.

In the above example, 20 frames are grouped, but it is possible to freely adjust the number of frames to be grouped according to content. Therefore, if the resolution is properly controlled according to content, the problem of resolution caused by the direct access can be solved as well.

Meanwhile, according to another embodiment of the present invention, when a multi-object audio content file is created by arranging and storing frames generated for each object constituting an audio content according to each object, 'individual position information for frames having the same reproduction time' can be stored as index information in a header of the multi-object audio content file.

Figure 6:
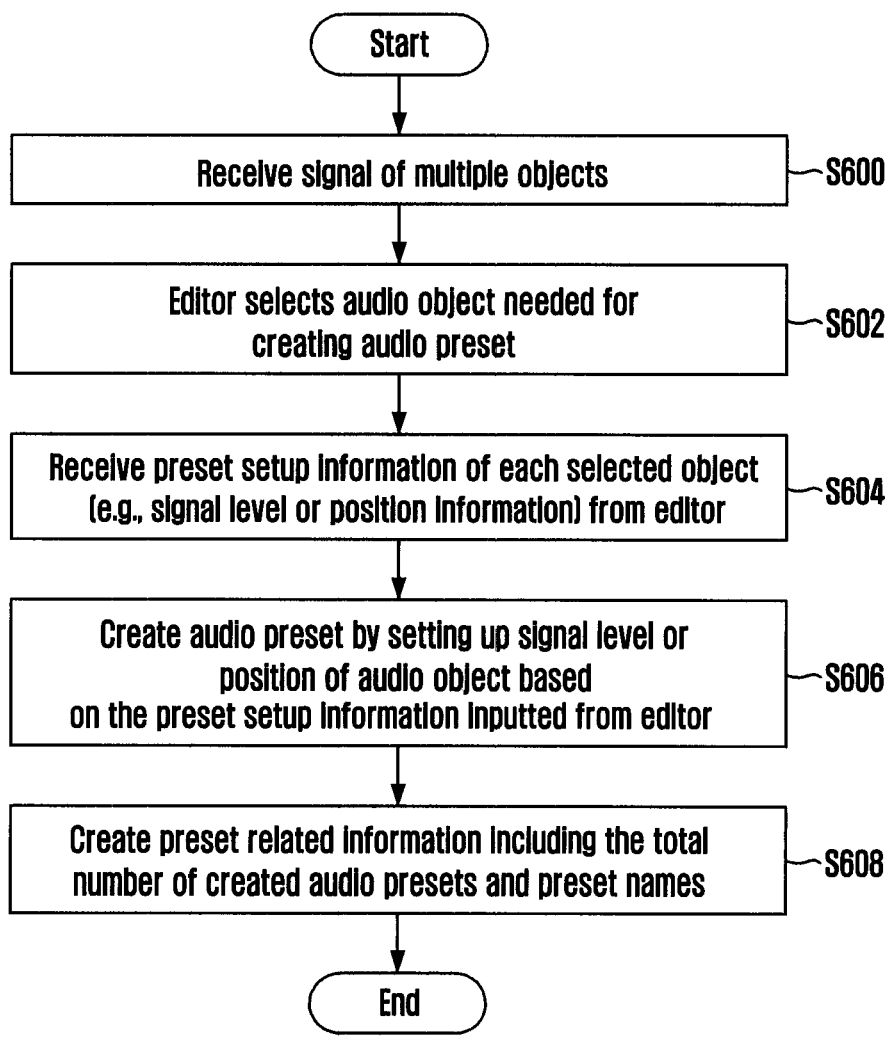
FIG. 6 is a flowchart describing an audio preset creating method for an object-based audio service in accordance with an embodiment of the present invention.

FIG. 6 is a flowchart describing an audio preset creating method for an object-based audio service in accordance with an embodiment of the present invention.

In step S600, an audio coding apparatus receives signals of multiple audio objects to be used for forming a multi-object audio content and provides the multi-object audio signals to an editor.

In step S602, the editor selects an object to be used for forming the multi-object audio content. In short, the audio coding apparatus receives a selection of an audio object needed for creating an audio preset from the editor.

Subsequently, in step S604, the audio coding apparatus receives preset setup information for the selected audio object from the editor. For example, when a 3D preset is created, the audio coding apparatus receives the signal level of each audio object and position information in 3D space. When a 2D preset is created, it receives the signal level of each audio object.

In step S606, the audio coding apparatus sets up the signal level or the 3D spatial position of each audio object based on the preset setup information inputted by the editor and generates an audio preset.

In step S608, the audio coding apparatus creates preset related information including the total number of presets and preset names of the audio presets created through the above process.

In short, the editor creates a plurality of preset information by differentiating the signal size and position information of each audio object, provides information on them in the bitstreams of a multi-object audio content file, and provides them to a user so that the user can select any one among them according to a taste of the user.

The preset creation process of FIG. 6 will be described in detail by taking an example, where a plurality of presets are created using such audio objects as the vocal of a singer, guitar, piano, drum, and keyboard.

Preset 1 (vocal mode): vocal (level 9), guitar (level 0), piano (level 0), drum (level 0), and keyboard (level 0)

Preset 2 (instrumental mode): vocal (level 8), guitar (level 8), piano (level 8), drum (level 8), and keyboard (level 8)

Preset 3 (karaoke mode): vocal (level 0), guitar (level 9), piano (level 9), drum (level 9), and keyboard (level 9)

When the above three presets are set up, the established preset, the number of presets, and preset names are stored in bitstreams of the multi-object audio content file.

Later, the user can select any one among the vocal mode, the instrumental mode, and the karaoke mode out of one music content and listen to the music content.

In the above, the method of creating an audio preset applied to the audio coding apparatus on the part of the editor, which is an editor preset, has been described. The same method is applied to a method for creating an audio preset applied to a content reproduction terminal of a user, which is a user preset.

Figure 7:
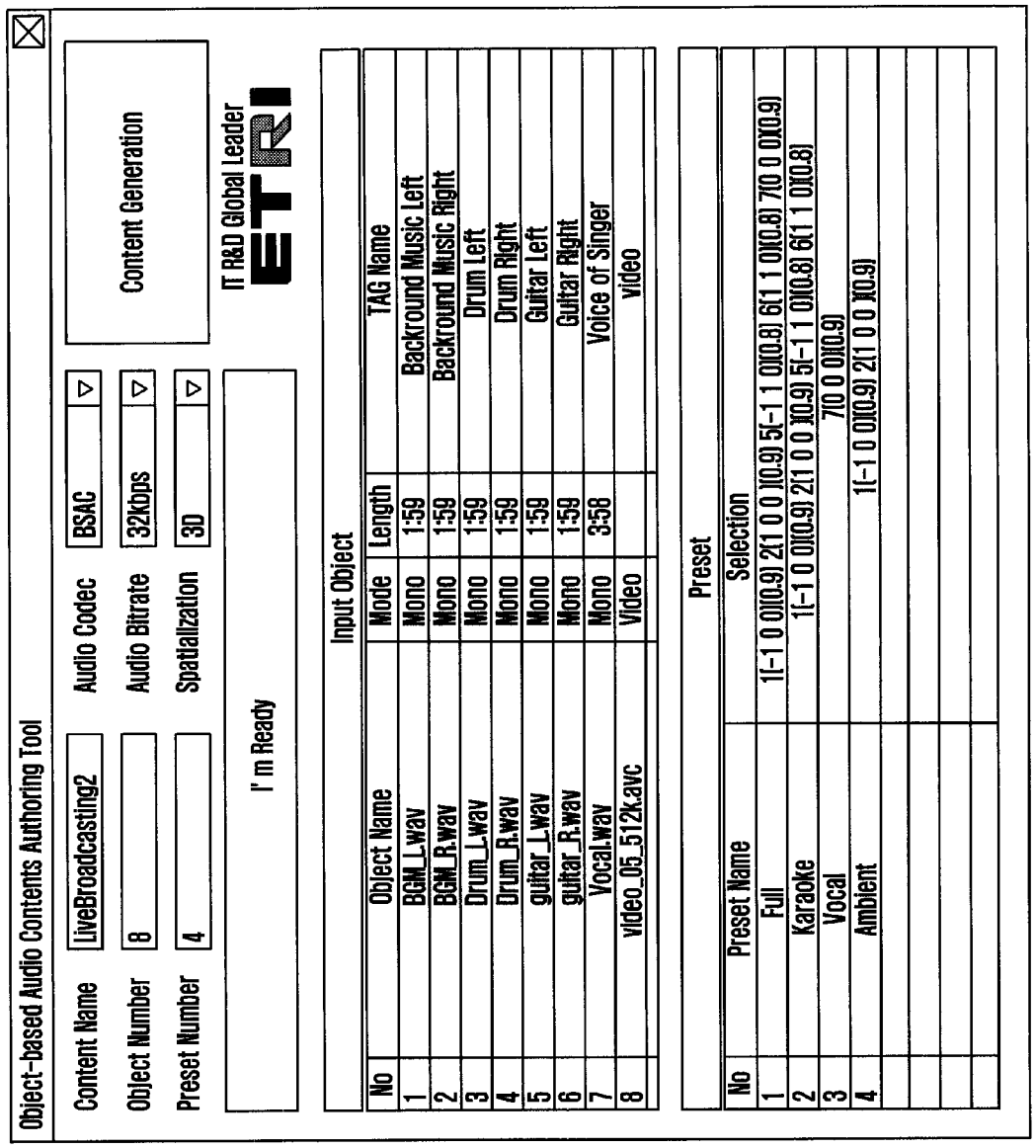
FIG. 7 shows a display of an audio coding apparatus on the part of an editor in accordance with an embodiment of the present invention.

FIG. 7 shows a display of an audio coding apparatus on the part of an editor in accordance with an embodiment of the present invention. The drawing shows creation of diverse audio presets through inputted audio objects. In 1 (−1 0 0) (0.9) related to a preset 1 (Full) of FIG. 7, "1" denotes an object, and "(−1 0 0)" denotes 3D spatial position, and "(0.9)" denotes the level of object signals.

Figure 8:
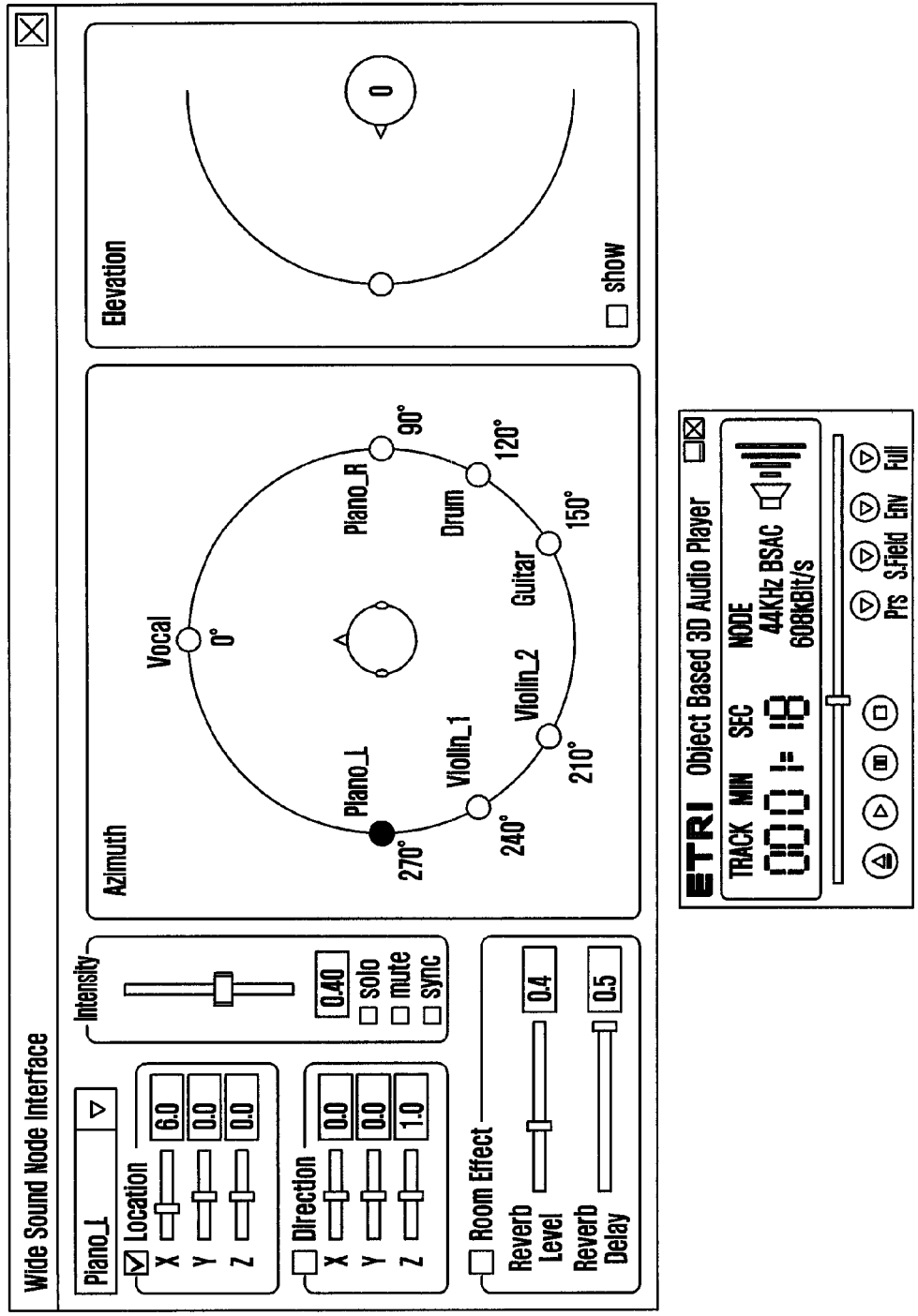
FIG. 8 shows a display of a content reproduction terminal on the part of a user in accordance with an embodiment of the present invention.

FIG. 8 shows a display of a content reproduction terminal on the part of a user in accordance with an embodiment of the present invention.

The content reproduction terminal of the user shows preset names to the user and when the user selects a certain preset, the content reproduction terminal forms an audio scene b using the signal level and position information of the audio object corresponding to the preset information.

When the user sets up a preset, the content reproduction terminal shows the user the name of an audio object, which is TAG Name, so that the user sets up the signal level and position of the audio object. Then, the content reproduction terminal stores the information set up by the user and creates a user preset, which is a preset defined by the user.

FIG. 9 is a flowchart describing a method for editing a multi-object audio content file in accordance with an embodiment of the present invention. The drawing shows an editing process of the multi-object audio content file in the content reproduction terminal of the user.

In step S900, the content reproduction terminal of the user outputs object information and audio preset information for the multi-object audio content file. Herein, the user inputs change requests if the user wishes to change the audio object and/or preset. The audio preset information includes an audio preset and preset related information, and it may be stored in the multi-object audio content file or as another file independent from the multi-object audio content file.

In step S902, the content reproduction terminal changes the audio object and/or preset for the multi-object audio content file upon receipt of a user request.

Although not illustrated in the drawing, when audio preset information is stored in a separate file, it may be stored in the multi-object audio content file later upon receipt of a user request for it.

Through the above-described editing method, the user can delete or change a specific audio object out of the existing object-based audio content file with a new audio object, or add a new audio object to thereby form a new content file. For example, the user may add a song sang by the user himself to a music content as an audio object and distribute the music content to other people. Also, the user may newly define the level and position information of each audio object according to a taste of the user and store the informations inside the content file or as a separate file.

FIG. 10 is a flowchart describing a method for reproducing a multi-object audio content file in accordance with an embodiment of the present invention. The drawing shows a reproduction process of the multi-object audio content file in a content reproduction terminal of the user.

First, in step S1000, the content reproduction terminal analyzes the multi-object audio content file upon receipt of a user request. In step S1002, the content reproduction terminal acquires index information on the position of object frames of the multi-object audio content file out of the analysis result. Herein, the multi-object audio content file may be a file storing frames of the same reproduction time in the same group. In this case, the position information of the first frame of the frame group becomes the index information. Differently from the case, when the multi-object audio content file is a file storing object frames according to each audio object, the position information of the individual frames having the same reproduction time becomes the index information.

In step S1004, the content reproduction terminal reproduces the multi-object audio content file by searching the object frames of the same reproduction time based on the acquired index information.

MODE FOR INVENTION

Although not illustrated in FIG. 10, a content reproduction terminal outputs the kind of an audio preset for a multi-object audio content upon receipt of a user request and forms a corresponding audio scene based on setup information of the audio preset selected by the user. Herein, the audio preset information may be stored in the multi-object audio content file or as a separate file.

The method of the present invention described above can be realized as a program and stored in a computer-readable recording medium, such as CD-ROM, RAM, ROM, floppy disks, hard disks, and magneto-optical disks. Since this process can be easily implemented by those skilled in the art to which the present invention pertain. Further description will not be provided herein.

While the present invention has been described with respect to certain preferred embodiments, it will be apparent to those skilled in the art that various changes and modifications may be made without departing from the scope of the invention as defined in the following claims.

What is claimed is:

1. A method for creating a multi-object audio content file for an object-based audio service, comprising:
    creating a plurality of frames according to each of a plurality of audio objects forming an audio content;
    creating a multi-object audio content file including the plurality of frames for each of a plurality of audio objects by editing the audio objects and a plurality of presets, wherein each of the plurality of presets is audio scene information defining spatial position about one or more audio objects;

creating preset related information including the number of the plurality of presets and a preset name of each of the plurality of presets; and grouping the plurality of frames based on reproduction characteristics of frames and storing the grouped frames.

2. The method of claim 1, wherein the at least one of presets is editable by user of reproduction terminal.

3. The method of claim 1, wherein grouping the plurality of frames based on reproduction characteristics of frames and storing the grouped frames comprises:

grouping and storing together frames having the same reproduction time.

4. A method for creating a multi-object audio content file for an object-based audio service, comprising:

creating a plurality of frames according to each of a plurality of audio objects forming an audio content by editing the audio objects;

grouping the plurality of frames based on reproduction characteristics of frames and storing the grouped frames;

creating a plurality of presets, wherein each of the plurality of presets is audio scene information defining spatial position about one or more audio objects, and preset related information; and creating a multi-object audio content file including a plurality of audio objects, at least one of presets and preset related information, wherein the preset related information comprises a total number of presets or a preset name of each of the plurality of presets.

5. The method of claim 4, wherein the at least one of presets is editable by user of reproduction terminal.

6. The method of claim 4, wherein the at least one of presets is selected by user of reproduction terminal, and wherein the multi-object audio content file reproduces based on the selected preset.

7. The method of claim 4, wherein grouping the plurality of frames based on reproduction characteristics of frames and storing the grouped frames comprises:

grouping and storing together frames having the same reproduction time.

8. A method for creating audio presets for a multi-object audio content file, comprising:

creating a plurality of frames according to each of a plurality of audio objects forming an audio content;

creating a multi-object audio content file including the plurality of frames for each of a plurality of audio objects by editing the audio objects and a plurality of presets, wherein each of the plurality of presets is audio scene information defining spatial position about one or more audio objects;

creating preset related information including the number of the plurality of presets and a present name of each of the plurality of presets; and grouping the plurality of frames based on reproduction characteristics of frames and storing the grouped frames, wherein the at least one of presets is stored in the multi-object audio content file or is stored as an independent file different from the multi-object audio content file.

9. The method of claim 8, wherein the at least one of presets is selected by user of reproduction terminal, and wherein the multi-object audio content file reproduces based on the selected preset.

10. The method of claim 8, wherein grouping the plurality of frames based on reproduction characteristics of frames and storing the grouped frames comprises:

grouping and storing together frames having the same reproduction time.

11. A method for editing a multi-object audio content file, comprising:

providing a user of reproduction terminal with a multi-object audio content file including in a plurality of audio objects, a plurality of audio presets for a plurality of audio objects and preset related information;

selecting an audio preset among at least one of audio presets by the user; and editing the selecting audio preset by a control of the user, wherein the multi-object audio content file includes a grouped a plurality of frames based on reproduction characteristics of frames, wherein each of the plurality of presets is audio scene information defining spatial position about one or more audio objects, and wherein the preset related information comprises the number of the plurality of presets and a preset name of each of the plurality of presets.

12. The method of claim 11, further comprising editing the multi-object audio content file by deleting audio object, changing new audio object, or adding new audio object included in the multi-object audio content file by the control of the user.

13. The method of claim 11, wherein the at least one of presets is selected by the user, and wherein the multi-object audio content file reproduces based on the selected preset.

14. The method of claim 11, wherein the edited audio preset is stored in the multi-object audio content file or is stored as an independent file different from the multi-object audio content file.

15. The method of claim 14, further comprising:

providing a preset related information to the user, wherein the preset related information comprises total number of presets or preset name about at least one of presets.

16. A method for reproducing a multi-object audio content file, comprising:

receiving a multi-object audio content file including in a plurality of audio objects and at least one of audio presets for a plurality of audio objects;

selecting an audio preset from among a plurality of audio presets by a user of reproduction terminal, wherein each of the plurality of presets is audio scene information defining at least one of spatial position, sound strength and echo information about one or more audio objects;

determining an audio scene based on the selected audio preset edited by control of the user; and reproducing the multi-object audio content file based on the audio scene, wherein the multi-object audio content file includes grouping frames based on reproduction characteristics of frames.

17. The method of claim 16, wherein the at least one of presets further comprises sounds strength or echo information about audio objects.

18. The method of claim 16, further comprising:

editing the selected audio preset by a control of the user.

19. The method of claim 16, further comprising:
  editing the multi-object audio content file by deleting audio object, changing new audio object, or adding new audio object included in the multi-object audio content file by the control of the user.

20. The method of claim 16, wherein the at least one of presets is stored in the multi-object audio content file or is stored as an independent file different from the multi-object audio content file.

\* \* \* \* \*